United States Patent [19]

Jadamus et al.

[11] Patent Number: 5,484,848
[45] Date of Patent: Jan. 16, 1996

[54] PROCESS FOR THE PRODUCTION OF A COMPOSITE ARTICLE OF A POLYAMIDE AND AN ELASTOMER

[75] Inventors: Hans Jadamus, Marl; Friedrich G. Schmidt; Horst Heuer, both of Haltern, all of Germany

[73] Assignee: Huels Aktiengesellschaft, Marl, Germany

[21] Appl. No.: 222,968

[22] Filed: Apr. 5, 1994

[30] Foreign Application Priority Data

Jun. 9, 1993 [DE] Germany ............... 43 19 142.8

[51] Int. Cl.⁶ .............. C08L 77/02; C08L 77/04; C08L 77/06; C08L 77/10
[52] U.S. Cl. ............ 525/105; 525/178; 525/184; 525/342; 428/475.8; 264/250
[58] Field of Search ............. 264/250; 525/105, 525/178, 184, 342; 428/475.8

[56] References Cited

U.S. PATENT DOCUMENTS

| | | |
|---|---|---|
| 3,398,045 | 8/1968 | Clayton et al. . |
| 4,800,120 | 1/1989 | Jadamus et al. . |
| 4,816,345 | 3/1989 | Jadamus et al. . |
| 4,835,063 | 5/1989 | Jadamus et al. . |
| 4,921,762 | 5/1990 | Jadamus et al. . |
| 5,006,603 | 3/1991 | Takaki et al. ............ 525/105 |
| 5,049,610 | 9/1991 | Takaki et al. ............ 524/514 |
| 5,102,489 | 4/1992 | Grosse-Puppendahl et al. . |
| 5,122,420 | 6/1992 | Baron et al. . |
| 5,132,182 | 7/1992 | Grosse-Puppendahl et al. ... 428/475.8 |
| 5,153,076 | 10/1992 | Jadamus et al. . |
| 5,332,621 | 7/1994 | Schmidt et al. . |

FOREIGN PATENT DOCUMENTS

| | | |
|---|---|---|
| 0142930 | 5/1985 | European Pat. Off. . |
| WO84/03240 | 8/1984 | WIPO . |

*Primary Examiner*—W. Robinson H. Clark
*Attorney, Agent, or Firm*—Oblon, Spivak, McClelland, Maier & Neustadt

[57] ABSTRACT

The invention describes a process for the production of a composite article of at least two component pieces, firmly bonded to one another, of a vulcanized rubber compound on the one hand and a polyamide composition on the other hand, the vulcanized rubber compound being prepared under customary vulcanization conditions in contact with the polyamide composition by vulcanization of a rubber compound which comprises the following components:

I. 100 parts by weight of a rubber,

II. 0 to 300 parts by weight of fillers,

III. 0 to 150 parts by weight of plasticizer,

IV. 1 to 10 parts by weight of peroxide vulcanization agent,

V. 0 to 4 parts by weight of vulcanization activators and

VI. 1 to 10 parts by weight of a silane containing double bonds.

8 Claims, No Drawings

PROCESS FOR THE PRODUCTION OF A COMPOSITE ARTICLE OF A POLYAMIDE AND AN ELASTOMER

This application claims the benefit of priority under 35 U.S.C. 119 to DE P43 19 142.8 filed in Germany on Jun. 9, 1993, the entire contents of which are hereby incorporated by reference.

BACKGROUND OF THE INVENTION

1. Field of the Invention

The invention relates to a process for the production of a composite article of at least two component pieces, bonded firmly to one another, of a vulcanized rubber compound on the one hand and a polyamide composition selected from the group consisting of a polyamide, a polyamide molding composition, a polyamide blend or a fiber reinforced composite material with a polyamide matrix on the other hand. The invention also relates to the composite article produced by this process.

2. Discussion of the Background

The technical object of firmly bonding rubbers and thermoplastics to one another is old and to date has been achieved in various ways, which overall, are unsatisfactory.

Composite materials of thermoplastically rigid and elastomeric molding compositions are usually joined together by gluing, screwing, riveting or mechanical clawing, or using an adhesion promoter. Interesting processes have recently been developed for production of a bond between molding compositions based on polyphenylene ethers (PPE) and certain rubbers which can be vulcanized with sulphur or peroxide (EP-A-0 196 407 and EP-A-0 315 749).

The adhesive strength values achieved by such methods are considerable; nevertheless, the resistance of the PPE molding compositions to solvents is still just as unsatisfactory, as is their stability to weathering. Moreover, such molding compositions can be processed only with difficulty because of their high melt viscosity.

In theory other thermoplastic molding compositions, with improved physical properties, could be employed in this process. However, it has been found that, for example, with polyamides (PA), which are known to be resistant to solvents, adequate adhesion values cannot be achieved under the process conditions recognized as essential. It therefore did not seem possible to produce bonds between polyamides and rubbers which have an adequate adhesive strength and a good resistance to solvents and weathering.

A solution to this problem has been proposed in EP-A-0 344 427. A thermoplastic which comprises at least 30 wt % of aliphatic polyamides are employed in conjunction with a rubber composition based on a rubber which contains carboxyl groups, as the essential feature.

On the basis of this, components of polyamide molding compositions reinforced with continuous fibers and of rubber are described in EP-A-0 422 358. Here too, the essential feature is that the rubber used contains carboxyl or anhydride functional groups.

According to the prior art, composites are thus only obtained, without using adhesion promoters, if the rubber contains carboxyl or anhydride groups. Furthermore, the polyamide should contain more amino than carboxyl groups.

According to the present state of knowledge, the manufacturer of rubber/polyamide composites faces the following dilemma:

Either to use rubber compounds based on resins produced by the RFS process (RFS=resorcinol/formaldehyde/silicon dioxide), as described by W. Kleemann in "Mischungen für die Elastverarbeitung (Mixtures for elastomer processing)" (VEB Deutscher Verlag für Grundstoffindustrie, Leipzig 1982). The flexability in choosing the physical properties of the elastomers is then limited, because flexible mixtures and mixtures with ethylene/propylene rubber adhere poorly. Other disadvantages of this method are described, for example, in Werner Hofmann, Rubber Technology Handbook 1989, Carl Hanser Verlag, chapter 4.7.4.

The use of external adhesion promoters by treatment of the surface of the plastic. This process is both cumbersome and environmentally polluting. This process is described, for example, in the journal "Kautschuk und Gummi-Kunststoffe", October 1991, pages 963 to 970.

The use of special rubbers with carboxyl or anhydride groups, as described in EP-A-0 344 427. The properties of these rubbers differ from those of standard rubbers. The special rubbers moreover are significantly more expensive than standard rubber. In addition, this method functions properly only if the polyamides used are regulated by diamines.

The use of peroxides and silanes in rubber compounds is known per se.

Peroxides are preferred vulcanization agents over sulphur or sulphur donors if a high resistance to heat is to be achieved in the vulcanized rubber compounds.

Silanes have been used in polymers such as rubbers, thermosets and thermoplastics if binding of inorganic fillers, for example talcum powder, quartz powder or glass fibers, to the organic polymer is to be effected. The manufacturers of fillers as a rule supply their products to the users ready-treated with silanes or other sizes. The users mix the fillers pretreated in this way, with the polymers so as to obtain reinforced molding compositions or reinforced compounds.

In the case of systems with a high content of mineral fillers, however, it may be advantageous for the user to employ non-sized fillers and to mix the silane or other sizes with the polymer before or together with the inorganic filler in the so-called "additive process". Such a procedure is often used for preparation of rubber compounds. These rubber compounds then contain in general about 0.2 to 2.5% by weight of silane, based on the filler, or up to about 1.5% by weight, based on the rubber compound (company publication "Dynasilan®" from Hüls AG, D-45764 Marl, Issue 7/92, page 26). A content of 2% by weight of silane in the rubber compound, based on the filler, is not usually exceeded.

Suggestions of the bonding mechanism between inorganic and organic components have been published in numerous publications. Reference may be made in particular in this context, to the company publication from Hüls AG, D-45764 Marl, entitled "Anwendungen von organofunktionellen Silanen (Uses of organofunctional silanes)" (October 1989).

The object of the present invention was therefore to develop composite partners which allow the production of composite articles of polyamides and elastomers yet still allow for the formation of a firm bond, in which the following aspects should be met:

Polyamides, polyamide blends, polyamide molding compositions and fiber reinforced composite materials with a polyamide matrix should be functional as the polyamide component. A special treatment—for example replacement of carboxyl groups by amino groups—should not be necessary.

Adhesive resins which impair the properties of the vulcanized rubber compounds should not be used in the rubber compounds.

Adhesion promoters which have to be applied between the polyamide and rubber in a separate working step should likewise not be employed.

Commercially available standard rubbers should be able to be used.

Additives for the adhesive bond should not substantially impair the properties of the vulcanized rubber compounds.

It has now been found that the requirements mentioned above are met if the rubber compounds contain certain silanes and are vulcanized with peroxides.

In contrast to the prior art use of silanes, the silanes of the present invention are employed in a controlled manner in order to achieve firm bonding to the thermoplastic/vulcanized rubber compound interface. Larger quantities are required for this purpose than for mere binding of inorganic fillers and reinforcing substances. The fact that the addition of such silanes to achieve this object was not obvious can be seen merely from the fact that no satisfactory bond is achieved with other thermoplastics, such as, for example, aromatic polyesters, for example polybutylene terephthalate or polyethylene terephthalate, instead of polyamide.

There are still no confirmed findings on the bonding mechanism which is active here between the polyamide and vulcanized rubber compound.

SUMMARY OF THE INVENTION

Accordingly, one embodiment of the present invention is to provide a process of producing a composite article of a vulcanized rubber compound and a polyamide composition.

A second embodiment of the present invention is to provide a composite article of a polyamide composition bound to a vulcanized rubber compound.

The objects of the invention, for the production of a composite article of at least two component pieces, bonded firmly to one another, of a vulcanized rubber compound on the one hand and a polyamide composition selected from the group consisting of a polyamide, a polyamide molding composition, a polyamide blend or a fiber reinforced composite material with a polyamide matrix on the other hand is provided for by a process which comprises: vulcanizing under customary vulcanization conditions a) a rubber compound comprising
I. 100 parts by weight of a rubber,
II. 0 to 300 parts by weight of fillers,
III. 0 to 150 parts by weight of plasticizer,
IV. 1 to 10 parts by weight of peroxide vulcanization agent,
0 to 4 parts by weight of vulcanization activators and
VI. 1 to 10 parts by weight of a silane; to form a vulcanized rubber compound; and
b) a polyamide composition selected from the group consisting of a polyamide, a polyamide molding composition, a polyamide blend, a fiber reinforced composite material with a polyamide matrix and a mixture thereof wherein said polyamide composition comprises at least 30% by weight of polyamide, wherein said vulcanization is performed while said rubber compound is in contact with said polyamide composition; and wherein said silane is of the formula

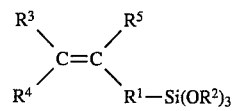

wherein $R^1$ is a divalent radical or a direct bond;

the $R^2$ groups are each independently hydrogen, substituted or unsubstituted $C_{1-20}$ alkyl, substituted or unsubstituted $C_{3-20}$ cycloalkyl or substituted or unsubstituted $C_{6-20}$ aryl, wherein said substituents are $C_{1-8}$ alkoxy;

$R^3$, $R^4$ and $R^5$ are each independently hydrogen, $C_{1-20}$ alkyl, $C_{3-20}$ cycloalkyl or $C_{6-20}$ aryl or a $COOR^2$ group.

$R^1$ is preferably a direct bond, a linear or branched $C_{1-12}$ alkylene group or a carboxyalkylene group of the formula

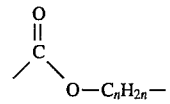

where n is 1 to 12.

$R^2$ is preferably a $C_{1-8}$ alkyl group or a $C_{1-6}$ alkoxy substituted $C_{1-8}$ alkyl radical.

$R^3$, $R^4$ and $R^5$ are preferably hydrogen, a $C_{1-8}$ alkyl group or a $C_{6-10}$ aryl.

DETAILED DESCRIPTION OF THE PREFERRED EMBODIMENTS

Polyamides suitable for practicing this invention are high molecular weight compounds which contain —CO—NH— bonds in their main chain. Suitable polyamides have a Mn in the range of 5,000 to 100,0000. They are as a rule obtained from diamines and dicarboxylic acids or from aminocarboxylic acids by polycondensation or from lactams by polymerization. All the polyamides which can be melted by heating are suitable. The polyamides can also comprise other constituents which are incorporated by polycondensation, such as, for example, glycols, in particular polyether glycols. Examples of suitable polyamides are PA 46, PA 6, PA 66, PA 610, PA 612, PA 1012, PA 11, PA 12, PA 1212, PA 6,3-T and PEBA, as well as mixtures thereof. Such polyamides and preparation methods are conventional to those of ordinary skill in the art.

Polyamide molding compositions suitable for practicing this invention are preparations of polyamides which have been formulated to improve the processing properties or to modify the properties during use. Polyamide molding compositions comprise, for example, stabilizers, lubricants, fillers, such as, for example, carbon black, graphite, metal spangles, titanium dioxide and zinc sulphide, reinforcing agents, such as, for example, glass fibers, carbon fibers, aramid fibers or metal fibers, plasticizers, dyestuffs and/or flameproofing agents. The content of reinforcing agent in the molding composition can be up to 50% by weight, that of flameproofing agent can be up to 20% by weight and that of all the other additives can be up to 10% in total, in each case based on the total molding composition.

Polyamide blends suitable for practicing this invention are molding compositions which are composed of polyamides and other polymers and the additives customary in polyamide molding compositions. The polymer constituents can be soluble in one another or one polymer constituent can be dispersed in the other, or the two can form interpenetrating networks with one another. Preferred polyamide blends suitable for practicing this invention are mixtures of polyamides and polyphenylene ethers in which the polyphenylene ether is dispersed in the polyamide. Such molding compositions are prepared by melting and mixing at least 30 per cent by weight, of a polyamide with up to 70 per cent by weight of a polyphenylene ether. Molding compositions based on polyamides and polyphenylene ethers are described, for example, in DE-A 30 27 104 and 35 18 278 and in EP-A-0 147 874 and EP-A-0 024 120. It is known to the expert that these molding compositions usually comprise a compatibility promoter. Other preferred polyamide blends are mixtures of polyamides with thermoplastic polyesters, in particular polybutylene terephthalate, the thermoplastic polyester being dispersed in the polyamide phase or forming an interpenetrating network with this.

Furthermore, impact-modified polyamides, for example polyamides with rubber dispersed therein, are also suitable.

Fiber reinforced composite materials with a polyamide matrix are to be understood as meaning materials which are composed of uncut reinforcing fibers or woven fabrics thereof on the one hand and a matrix of polyamides, polyamide molding compositions or polyamide blends on the other hand.

Fiber reinforced composite materials with a matrix of polyamides, polyamide molding compositions or polyamide blends can be prepared in various ways; for example reinforcing fibers or reinforcing woven fabrics impregnated with polyamides—so-called prepregs—can be consolidated to form laminated sheets by pressure and heat. It is also possible to process hybrid yarns of polyamide fibers and reinforcing fibers or films of the thermoplastics mentioned and woven fabric of reinforcing fibers to composite materials under pressure and heat. Suitable reinforcing fibers are, for example, glass fibers, carbon fibers and aramide fibers.

Examples of suitable rubbers which can be used, for example are, an EP(D)M rubber, an SB rubber (as E-SBR or S-SBR), BR, NR, IR, IIR, CIIR, BIIR, NBR, CR, a styrene-containing block copolymer and/or a polyalkenylene, as defined below.

EP(D)M rubbers are rubbers which can be prepared by conventional methods, by polymerization of a mixture of ethylene and propylene and if appropriate a diene in the presence of a Ziegler-Natta catalyst.

EPDM rubber can be prepared by, for example, by polymerization of a mixture of:
more than 25% wt. of ethylene,
more than 25% wt. of propylene and
up to 10% wt., in particular 1 to 3% wt., of a preferably nonconjugated diene, such as bicyclo[2.2.1]heptadiene, hexa-1,4-diene, dicyclopentadiene and, in particular, 5-ethylidenenorbornene.

SB rubber can be either E- or S-SBR with a styrene content up to a maximum of about 40 per cent by weight.

E-SBR can be prepared by conventional methods by polymerization in emulsion, while S-SBR can be prepared by polymerization in solution.

Butadiene rubber (BR) can be prepared by conventional methods, for example by polymerization with the aid of Li or Co catalysts. The type of linkage has no influence on suitability here.

Natural rubber (NR) is usually used in the cis-1,4-configuration. However, the trans-1,4-configuration is also suitable in the context of this invention.

Isoprene rubber (IR) can be used, independently of whether it has been prepared, for example, using Ti or Li catalysts. The cis-1,4/trans-1,4 or 1,2 and 3,4 content has no influence on the adhesion properties.

Isobutene/isoprene rubber (IIR) can be used as such or in halogenated (i.e. chlorinated or brominated) form (CIIR or BIIR).

Nitrile rubber (NBR) is obtained by copolymerization of butadiene and acrylonitrile in weight ratios of about 51:48 to 82:18. It is prepared practically exclusively in aqueous emulsion. The resulting emulsions are worked up to the solid rubber for use in the context of this invention.

Chloroprene rubber (CR) is usually prepared by free-radical emulsion polymerization. During this operation, the monomer is incorporated into the polymer in various structures. The cis-1,4/trans-1,4 or 1,2 and 3,4 content and the content of head/head and head/tail linkage has no influence on the adhesion properties.

Styrene-containing block copolymers which can be used are all known types based on styrene/butadiene or styrene/isoprene. Examples of these are SB, SBS and SIS and corresponding types which comprise a larger number of blocks. The copolymers can be linear or branched here. The flexible phase furthermore can be hydrogenated; corresponding block copolymers are also called styrene/ethylene/butylene/styrene block copolymers (SEBS).

Polyalkenylenes are prepared by ring-opening or ring-extending polymerization of cycloalkenes [see K. J. Ivin, T. Saegusa, "Ring-opening Polymerization", Volume 1, Elsevier Appl. Sci. Publishers, London, in particular pages 121 to 183 (1984)]. Of these, polyoctenylenes are preferred (compare A. Draxler, Kautschuk+Gummi, Kunststoff 1981, pages 185 to 190). Polyoctenylenes with different contents of cis and trans double bonds and different molecular weights are obtainable by methods which are known from the literature.

A rubber which comprises 30 to 100 parts by weight, of an EP(D)M rubber and 70 to 0 parts by weight, of other rubbers is preferably used in the context of this invention.

In a preferred embodiment, the rubber does not contain carboxyl groups, such as those resulting from incorporation of unsaturated acid, acid derivatives or anhydrides.

Suitable fillers are all the substances which are usually employed in rubbers, such as, for example, carbon black, silicic acid, silicates, calcium carbonate, zinc oxide and talc. If highly active fillers are used, an increased amount of silane is required in order to achieve an adhesive bond.

Suitable plasticizers are, in particular, naphthenic and/or aliphatic oils or special plasticizers which are customary in rubber technology, such as, for example, polyalcohol fatty acid esters or thioethers, in an amount of preferably up to 50 parts by weight per 100 parts by weight of rubber.

Suitable peroxide vulcanization agents are the peroxides known to the expert, such as, for example, 2,5-dimethyl-2,5-bis(tert-butylperoxy)hexane, dicumyl peroxide, 4,4-di-tert-butylperoxy-n-butyl valerate, 1, 1-di-tert-butylperoxy-3,3,5-trimethyl-cyclohexane and bis(tert-butylperoxyisopropyl)benzene. Details on the use of peroxide vulcanization agents are to be found in the company brochure "Rubbery Chemical-Crosslinking-Peroxides" from Akzo-Chemie (publication date: April 1985).

Suitable vulcanization activators are, for example, triallyl cyanurate (TAC) and acrylates, such as ethylene glycol dimethacrylate (EDMA), butanediol dimethacrylate (BDMA) and trimethylolpropane trimethacrylate (TRIM). TAC, BDMA and/or EDMA are preferred. Suitable vulcanization activators can be prepared by conventional means known to those of ordinary skill in the art.

Suitable silanes are, for example, vinyltrimethoxy- and -triethoxysilane, vinyl-tris(2-methoxyethoxy)silane and 3-methacryloxypropyl-trimethoxy- and -triethoxysilane. 3-Methacryloxypropyl-trimethoxysilane is preferably used here. The silanes are preferably employed in amounts of 2 to 6 parts by weight per 100 parts by weight of rubber.

The rubber compounds furthermore can comprise other additives, such as, for example, vulcanization retardants, anti-ageing agents, processing auxiliaries, mold release agents and/or blowing agents. These other additives as a rule make up not more than 50 parts by weight per 100 parts by weight of rubber. The preparation of such compounds is described, for example, by F. W. Barrow in "Rubber Compounding", published in 1988 by Marcel Dekker Inc., New York and Basel.

The articles of the polyamides, polyamide molding compositions or polyamide blends on the one hand and rubber compounds on the other hand can be produced in one stage or two stages. Articles of fiber reinforced composite materials and rubber compounds are produced in two stages.

In the two-stage process, the rigid molding is first produced by injection molding, extrusion or consolidation of prepregs, and charged with the rubber compound, preshaped if appropriate, and exposed to the vulcanization conditions for the rubber in a second step. The rigid molding can be charged with the rubber by pressing, injection molding or extrusion.

The two-stage injection molding process is carried out in a manner similar to the two-stage production of two-color injection moldings. A molding of the rigid materials mentioned is used as the insert. The cylinder and screw of the injection molding machine are designed in the conventional manner for rubber processing and the mold can be heated to vulcanization temperatures. If an external mold release auxiliary is used, it should be ensured that it does not reach the boundary layer of the materials, since it might impair the adhesive bond.

The optimum vulcanization conditions depend on the rubber mixture chosen, in particular its vulcanization system, and the shape of the molding. The known parameters gained from experience can be used as a basis here, since the silane additive does not influence the reaction conditions.

Suitable material temperatures for the rubber mixture in the cylinder are in general in the range from 40° to 80° C., preferably from 60° to 70° C.

Suitable mold temperatures depend on the softening temperatures of the inserts. They are in general in the range from 140° to 200° C. If the softening ranges of the inserts allow, temperatures in the upper range are chosen, for example between 170° and 190° C. The vulcanization times depend on the vulcanization temperatures and on the geometry of the components, as well as on the rubber mixture. They are in general between 30 s and 30 min; lower temperatures and thicker rubber components require longer times.

In the case of charging and complete vulcanization by the two-stage extrusion process, for example, a profile of a polyamide molding composition, for example a tube, is sheathed with the rubber composition and the rubber is vulcanized completely, if appropriate under pressure. A corresponding procedure is carried out with sheets of polyamide molding compositions or of fiber reinforced composite materials with a polyamide matrix.

In the one-stage injection molding process, the procedure is analogous to the one-stage two-color injection molding process. In this case, one injection molding machine is equipped for thermoplastic processing and the other for rubber processing. The mold is heated up to the given vulcanization temperature, which should be below the solidification temperature of the polyamide, polyamide molding composition or polyamide blend.

Intended uses for the components according to the invention of the polyamides, polyamide molding compositions, polyamide blends and fiber reinforced composite materials with a polyamide matrix on the one hand and the rubber compounds mentioned on the other hand are, for example, seals, housings for engines, pumps and electrically operated tools, rollers, tires, couplings, stop buffers, conveyor belts and soundproofing and vibration-damping components.

Having generally described this invention, a further understanding can be obtained by reference to certain specific examples which are provided herein for purposes of illustration only and are not intended to be limiting unless otherwise specified.

EXPERIMENTAL SECTION

The following materials were used for preparation of the rubber mixture:

BUNA HÜLS AP 341, a random EPDM rubber (Hüls AG, 45764 Marl) having a Mooney viscosity of ML (1+4) 100° C.=70.

Durex 0: Carbon black from Degussa with a CTAB value of 20 $m^2/g$.

Omyalite: Calcium carbonate from Omya, Köln, having a specific surface area of about 7.5 $m^2/g$.

Sillitin Z86: Aluminium silicate from Hoffmann Mineral, Neuburg, Donau, having a specific surface area of approximately 14 $m^2/g$.

ZnO RS: Zinc oxide from Carl Arnsberger, Köln

Vulkanox HS: Polymerized 2,2,4-trimethyl-1,2-di-hydroquinoline from Rhein-Chemie, Rheinau BDMA: Butanediol dimethacrylate, 75% on Ca silicate from Lehmann & Voss Perkadox 14/40: bis-tert-Butylperoxy-isopropylbenzene, 40% strength on chalk and $SiO_2$ from Akzo Chemicals, Düren DYNASILAN MEMO: Methacryloxypropyltrimethoxysilane from Hüls, Troisdorf DYNASILAN AMEO: Aminopropyltriethoxysilane from Hüls, Troisdorf DYNASILAN VTMOEO: Vinyl-tri(methoxy-ethoxy) silane from Hüls, Troisdorf DYNASILAN GLYMO: Glycidyloxypropyltrimethoxysilane from Hüls, Troisdorf DYNASILAN DAMO: N-Aminoethyl-3-aminopropyl-trimethoxysilane from Hüls, Troisdorf Sunpar 2280: Paraffinic (73%)/naphthenic (23%)/aromatic (4%) oil from Sun Oil, Belgium The following molding compositions were employed as polyamide materials:

Type A corresponds to a polyether block amide (PERA) based on polyamide 12, VESTAMID E 55 from Hüls AG, D-45764 Marl having a Shore D hardness of 55.

Type B corresponds to a polyamide 12, VESTAMID L from Hüls AG, D-45764 Marl having a solution viscosity ($\eta_{rel}$) of 2.1 in a 0.5% strength solution in m-cresol and a carboxyl to amino end group ratio of about 3.5.

Type C corresponds to a polyamide 12, VESTAMID L from Hüls AG, D-45764 Marl having a solution viscosity ($\eta_{rel}$) of 2.1 in a 0.5% strength solution in m-cresol and a carboxyl to amino end group ratio of about 0.3.

Type D corresponds to a polyamide 12, VESTAMID L from Hüls AG, D-45764 Marl having a solution viscosity ($\eta_{rel}$) of 2.1 in a 0.5% strength solution in m-cresol and a carboxyl to amino end group ratio of about 0.3. The molding composition additionally comprises 7.5% by weight of N-butylbenzenesulphonamide as a plasticizer.

Type E corresponds to a polyamide 612, VESTAMID D from Hüls AG, D-45764 Marl having a solution viscosity ($\eta_{rel}$) of 1.8 in a 0.5% strength solution in m-cresol and a carboxyl to amino end group ratio of about 3.

Type F corresponds to a polyamide 612, VESTAMID D from Hüls AG, D-45764 Marl having a solution viscosity ($\eta_{rel}$) of 1.8 in a 0.5% strength solution in m-cresol and a carboxyl to amino end group ratio of about 0.4.

Type G corresponds to a polyamide 6, Ultramid B4 from BASF AG, Ludwigshafen.

Type H corresponds to a polyamide 6,3-T, Trogamid T5000 from Hüls AG, D-45764 Marl.

PREPARATION OF THE RUBBER MIXTURES

The individual rubber mixtures I.1 to V.4 were prepared in a batch laboratory measuring kneader (Haake). 28.57 g of BUNA HÜS AP 341 was first plasticized at a starting temperature of 60° C. and at a speed of rotation of 64 rpm. 5.71 g of Sunpar 2280, the filler shown in Table 1, 1.43 g of ZnO RS and 0.57 g of Vulkanox HS were incorporated into the rubber in the course of about five minutes and the mixture was homogenized for a further three minutes. During this period, the temperature rose to about 110° C. This premix was then stored at room temperature for ≧24 h. 1.71 g of Perkadox 14/40, 0.43 g of BDMA and the silane shown in Table 1 were then incorporated homogeneously under the same conditions (60° C. starting temperature, 64 rpm) in the course of about four minutes. During this operation, the temperature of the mixture did not rise above 130° C.

TABLE 1

| | Composition of the rubber mixtures | | | | | | | |
|---|---|---|---|---|---|---|---|---|
| | Filler | | | DYNASILAN type | | | | |
| Mixture | Sillitin Z86 [g] | Omyalite [g] | Durex O [g] | MEMO [g] | GLYMO [g] | AMEO [g] | DAMO [g] | VTMOEO [g] |
| I.1 | 22.86 | — | — | — | — | — | — | — |
| I.2 | 22.86 | — | — | 0.29 | — | — | — | — |
| I.3 | 22.86 | — | — | 0.57 | — | — | — | — |
| I.4 | 22.86 | — | — | 1.14 | — | — | — | — |
| I.5 | 22.86 | — | — | — | 1.14 | — | — | — |
| I.6 | 22.86 | — | — | — | — | 1.14 | — | — |
| I.7 | 22.86 | — | — | — | — | — | 1.14 | — |
| I.8 | 22.86 | — | — | — | — | — | — | 1.14 |
| II.1 | 5.71 | — | — | — | — | — | — | — |
| II.2 | 5.71 | — | — | 0.29 | — | — | — | — |
| II.3 | 5.71 | — | — | 0.57 | — | — | — | — |
| II.4 | 5.71 | — | — | 1.14 | — | — | — | — |
| III.1 | — | 22.86 | — | — | — | — | — | — |
| III.2 | — | 22.86 | — | 0.29 | — | — | — | — |
| III.3 | — | 22.86 | — | 0.57 | — | — | — | — |
| III.4 | — | 22.86 | — | 1.14 | — | — | — | — |
| III.5 | — | 22.86 | — | — | 1.14 | — | — | — |
| III.6 | — | 22.86 | — | — | — | 1.14 | — | — |
| III.7 | — | 22.86 | — | — | — | — | 1.14 | — |
| III.8 | — | 22.86 | — | — | — | — | — | 1.14 |
| IV.1 | — | 5.71 | — | — | — | — | — | — |
| IV.2 | — | 5.71 | — | 0.29 | — | — | — | — |
| IV.3 | — | 5.71 | — | 0.57 | — | — | — | — |
| IV.4 | — | 5.71 | — | 1.14 | — | — | — | — |
| V.1 | — | — | 22.86 | — | — | — | — | — |
| V.2 | — | — | 22.86 | 0.29 | — | — | — | — |
| V.3 | — | — | 22.86 | 0.57 | — | — | — | — |
| V.4 | — | — | 22.86 | 1.14 | — | — | — | — |

PRODUCTION OF THE COMPOSITES

Test specimens (100×100×4 nm) of the polyamides investigated were produced by the injection molding process at a cylinder temperature of 250° C. A sheet was then placed in a mold of V2A steel (100×100×8 mm) and covered with a 20 mm wide piece of PTFE film on one side. The total surface was covered with the rubber mixture to be tested. The sheet prepared in this way was pressed in a hydraulic press (Schwabenthan - Polystat 200T) under the following conditions, depending on the type of molding composition used:

a) 40 minutes at 160° C. under 200 bar (molding composition type A, H)

b) 20 minutes at 180° C. under 200 bar (molding composition type B, C, D)

c) 10 minutes at 200° C. under 200 bar (molding composition type E, F, G)

TESTING THE ADHESIVE BOND

The adhesive bond between the polyamide material and vulcanized rubber was tested by means of a peel test in accordance with DIN 53 531. The rubber component, which had been kept separated from the polyamide material by the Teflon film during vulcanization, was clamped such that the rubber strip was pulled off perpendicularly to the thermoplastic surface in the peel tests. The results are shown in Table 2, the evaluation being made as follows:

Ad Adhesion (fracture in the rubber, that is to say cohesive fracture; high separating force)

− No adhesion (fracture in the interface between the rubber and polyamide, that is to say adhesive fracture; low to very low separating force)

p partial adhesion (boundary between cohesive and adhesive fracture; average separating force)

TABLE 2

Testing the adhesive bond

| Example (E) or Comparison Example (C) | Rubber Mixture | A | B | C | D | E | F | G | H |
|---|---|---|---|---|---|---|---|---|---|
| C1  | I.1   | —  | —  | —  | —  | —  | —  | —  | —  |
| E1  | I.2   | —  | —  | —  | —  | —  | Ad | —  | —  |
| E2  | I.3   | —  | —  | Ad | Ad | —  | Ad | p  | —  |
| E3  | I.4   | Ad | Ad | Ad | Ad | Ad | Ad | Ad | Ad |
| C2  | I.5   | —  | —  | —  | —  | —  | —  | —  | —  |
| C3  | I.6   | —  | —  | —  | —  | —  | —  | —  | —  |
| C4  | I.7   | —  | —  | —  | —  | —  | —  | —  | —  |
| E4  | I.8   | —  | Ad | p  | Ad | p  | Ad | p  | —  |
| C5  | II.1  | —  | —  | —  | —  | —  | —  | —  | —  |
| E5  | II.2  | —  | —  | —  | —  | —  | —  | —  | —  |
| E6  | II.3  | —  | —  | Ad | Ad | Ad | Ad | Ad | Ad |
| E7  | II.4  | Ad | Ad | Ad | Ad | Ad | Ad | Ad | Ad |
| C6  | III.1 | —  | —  | —  | —  | —  | —  | —  | —  |
| E8  | III.2 | —  | —  | —  | —  | —  | Ad | —  | —  |
| E9  | III.3 | —  | —  | Ad | Ad | —  | Ad | —  | Ad |
| E10 | III.4 | Ad | Ad | Ad | Ad | Ad | Ad | Ad | Ad |
| C7  | III.5 | —  | —  | —  | —  | —  | —  | —  | —  |
| C8  | III.6 | —  | —  | —  | —  | —  | —  | —  | —  |
| C9  | III.7 | —  | —  | —  | —  | —  | —  | —  | —  |
| E11 | III.8 | —  | Ad | p  | Ad | p  | Ad | p  | p  |
| C10 | IV.1  | —  | —  | —  | —  | —  | —  | —  | —  |
| E12 | IV.2  | —  | —  | —  | —  | —  | —  | —  | —  |
| E13 | IV.3  | —  | Ad | Ad | Ad | Ad | Ad | —  | Ad |
| E14 | IV.4  | Ad | Ad | Ad | Ad | Ad | Ad | Ad | Ad |
| C11 | V.1   | —  | —  | —  | —  | —  | —  | —  | —  |
| E15 | V.2   | —  | Ad | Ad | Ad | Ad | Ad | Ad | Ad |
| E16 | V.3   | Ad | Ad | Ad | Ad | Ad | Ad | Ad | Ad |
| E17 | V.4   | Ad | Ad | Ad | Ad | Ad | Ad | Ad | Ad |

Comparison Examples C1, C5, C6, C10 and C11 show that no firm bond can be obtained without the addition of silane.

Comparison Examples C2 to C4 and C7 to C9 show that silanes which do not have a double bond as required according to the invention but have another functional group, are unsuitable for production of a firm bond.

Examples E1, E5, E8, E12 and E15 show that in the region of the lower limit of the silane content, often no adequate bond is obtained because of the silane-consuming action of the filler, but that good results are obtained if a filler having a small surface area is present.

The influence of the silane content with an otherwise identical composition of the rubber compound becomes clear, for example, in the series C1, E1, E2 and E3.

The fact that the effect according to the invention is limited to the use of a thermoplastic component based on polyamide is documented by the following Comparison Example C12.

COMPARISON EXAMPLE C12

A polybutylene terephthalate having the commercial name VESTODUR 1000 (Hüls AG, D-45764 Marl) is employed as the thermoplastic component.

Rubber mixture V.4 is used as the rubber compound.

A composite is produced from these components as in the preceding examples and comparison examples (pressing conditions 20 minutes at 180° C. under 200 bar). Testing leads to an adhesive fracture with only a very low separating force.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the production of a composite article of at least two component pieces, firmly bonded to one another comprising: vulcanizing
   a) a molding of a rubber composition comprising
      I. 100 parts by weight of a rubber, wherein the rubber does not contain carboxyl groups,
      II. 0 to 300 parts by weight of fillers,
      III. 0 to 150 parts by weight of plasticizer,
      IV. 1 to 10 parts by weight of peroxide vulcanization agent,
      V. 0 to 4 parts by weight of vulcanization activators and
      VI. 1 to 10 parts by weight of a silane; and
   b) a molding of a polyamide composition which comprises at least 30% by weight of polyamide,
   wherein said vulcanization is performed while said rubber composition is in contact with said polyamide composition; and
   wherein said silane is of the formula

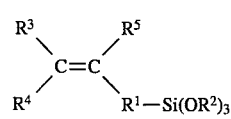

wherein $R^1$ is a divalent radical or a direct bond;
   the $R^2$ groups are each independently hydrogen, substituted or unsubstituted $C_{1-20}$ alkyl, substituted or unsubstituted $C_{3-20}$ cycloalkyl or substituted or unsubstituted $C_{6-20}$ aryl, wherein said substituents are $C_{1-8}$ alkoxy;
   $R^3$, $R^4$ and $R^5$ are each independently hydrogen, $C_{1-20}$ alkyl, $C_{3-20}$ cycloalkyl or $C_{6-20}$ aryl or a $COOR^2$ group.

2. The process of claim 1, wherein 2 to 6 parts by weight of said silane per 100 parts by weight of said rubber are employed.

3. The process of claims 1 or 2, wherein said silane is selected from the group consisting of vinyltrimethoxysilane, vinyltriethoxysilane, vinyl-tris(2methoxyethoxy)silane, 3-methacryloxypropyltrimethoxysilane, 3-methacryloxypropyltriethoxysilane and a mixture thereof.

4. The process of claim 3, wherein said rubber is selected from the group consisting of an ethylene/propylene rubber, ethylene/propylene/diene rubber, emulsion polymerization styrene/butadiene rubber, solution polymerization styrene/butadiene rubber, butadiene rubber, natural rubber, isoprene rubber, isobutene/isoprene rubber, chlorinated isobutene/isoprene rubber, brominated isobutene/isoprene rubber, nitrile rubber, chloroprene rubber, a styrene-containing block copolymer, a polyalkenylene and a mixture thereof.

5. The process of claim 3, wherein said rubber comprises 30 to 100 parts by weight of an ethylene/propylene rubber or ethylene/propylene/diene rubber, and 70 to 0 parts by weight of other rubbers.

6. The process of claim 3, wherein said rubber compound further comprises an element selected from the group consisting of a vulcanization retardant, an anti-ageing agent, a processing auxiliary, a mold release agent, a blowing agent and a mixture thereof.

7. The process of claim 3, wherein said composite article is prepared in a one-stage or in a two-stage process, wherein the material temperature of said rubber composition in the cylinder being in the range from 40° to 80° C. and the mold temperature being in the range from 140° to 200° C.

8. A composite article produced according to the method of claim 1.

* * * * *